(12) United States Patent
Sfikas et al.

(10) Patent No.: US 6,254,707 B1
(45) Date of Patent: Jul. 3, 2001

(54) METHOD FOR PRODUCING A THERMOPLASTICS FOLDER AND THE LIKE BY SIMULTANEOUSLY SEALING AND TEAR/CUTTING THE MARGINAL EDGE TO PRODUCED A UNIFORM MARGIN AND THE ARTICLE PRODUCED THEREBY

(75) Inventors: Nicholas Sfikas, Pittsford; Terry A. Downey, Fairport, both of NY (US)

(73) Assignee: Rochester 100 Inc., Rochester, NY (US)

( * ) Notice: Subject to any disclaimer, the term of this patent is extended or adjusted under 35 U.S.C. 154(b) by 0 days.

(21) Appl. No.: 09/373,714

(22) Filed: Aug. 13, 1999

(51) Int. Cl.[7] ..................................................... B32B 31/18
(52) U.S. Cl. ..................... 156/73.3; 156/251; 156/267; 156/290; 156/308.4; 229/67.1
(58) Field of Search ................................. 156/73.1, 73.3, 156/250, 251, 267, 290, 308.2, 308.4, 580.1, 580.2; 229/67.1

(56) References Cited

U.S. PATENT DOCUMENTS

| | | | |
|---|---|---|---|
| 3,516,599 | * | 6/1970 | Buttery ..................................... 229/72 |
| 4,629,349 | * | 12/1986 | Pitts ......................................... 402/74 |
| 4,934,584 | * | 6/1990 | Wyant ................................. 229/67.1 |
| 5,059,052 | * | 10/1991 | Casper ................................. 402/80 R |
| 5,266,140 | * | 11/1993 | Kohno ................................... 156/227 |
| 5,275,438 | * | 1/1994 | Struhl ..................................... 281/31 |
| 5,417,509 | * | 5/1995 | Schwartz ............................... 402/79 |
| 5,445,417 | * | 8/1995 | Bromer et al. ......................... 281/46 |
| 5,752,721 | * | 5/1998 | Balbas ................................. 281/19.1 |
| 5,863,383 | * | 1/1999 | Bussey ................................. 156/530 |
| 5,873,513 | * | 2/1999 | Ong ..................................... 229/67.1 |
| 5,876,143 | * | 3/1999 | Ong ......................................... 402/3 |

* cited by examiner

*Primary Examiner*—James Sells
(74) *Attorney, Agent, or Firm*—Shlesinger, Arkwright & Garvey LLP

(57) ABSTRACT

This invention relates to the method of producing a laminated vinyl thermoplastic stationery article from thermoplastic film material which simultaneously seals and tear/cuts the material leaving the article with a finished edge running parallel and adjacent to the seal applied to the margin of the article; and this invention also includes the article manufactured by the method set out.

28 Claims, 5 Drawing Sheets

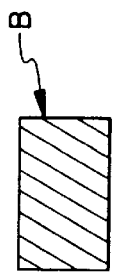
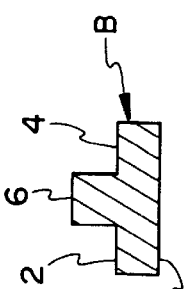
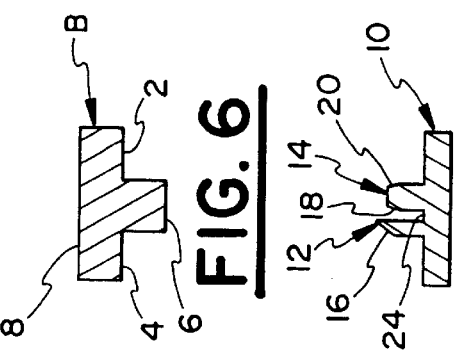
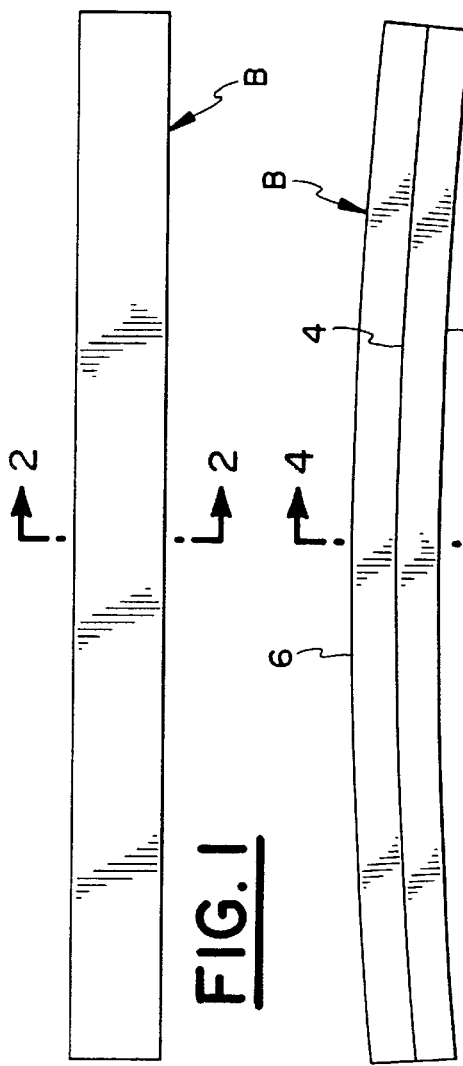
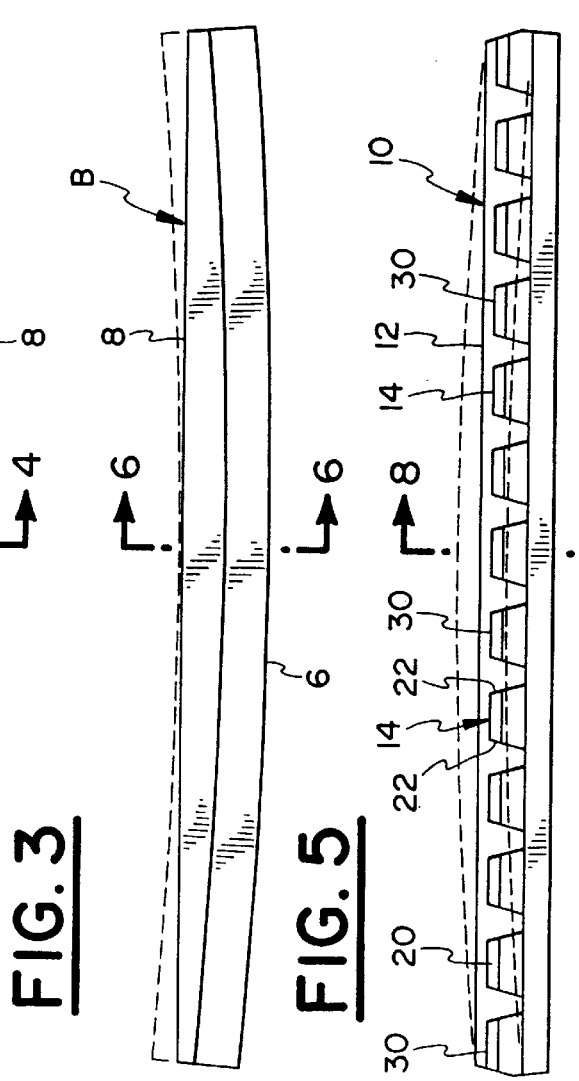

METHOD FOR PRODUCING A THERMOPLASTICS FOLDER AND THE LIKE BY SIMULTANEOUSLY SEALING AND TEAR/CUTTING THE MARGINAL EDGE TO PRODUCED A UNIFORM MARGIN AND THE ARTICLE PRODUCED THEREBY

FIELD OF THE INVENTION

The present invention relates to a method and article produced thereby from laminated thermoplastic material having a uniform and an attractive marginal edge adjacent to seal by simultaneous sealing and tears/cutting of the marginal edge of the material thereby producing an attractive and finely finished article.

HISTORY AND BACKGROUND OF THE INVENTION

Stationery articles such as folders, portfolios and pocket document binders have long been produced such as illustrated in U.S. Pat. Nos. 5,876,143; 5,059,052; 5,752,721 and 5,417,509, including paper folders such as U.S. Pat. Nos. 4,934,584 and 3,516,599. Vinyl folios and folders are illustrated in U.S. Pat. Nos. 5,873,513 and 4,629,349. More specifically, polyethylene, polypropylene and polyvinyl chloride articles are illustrated in patents U.S. Pat. Nos. 5,275,438; 5,445,417 and 5,266,140.

Today, paper materials are less likely to be used in stationery paper products having pockets because of the durability factor. They do not stand up under heavy service necessating more durable materials. Problems have developed with the use of folders made of certain thermoplastic materials which tend to pick up the ink from inserted letters or the like leaving the transferred ink on the folders in an unsightly manner, and often where the folders are transparent, causing interference with subsequent articles placed in the folders because of ink transferred thereon at an earlier date.

Polypropylene has been found to be a thermoplastic material which when made into folders does not pick up ink from the papers inserted therein; whereas polyethylene and polyvinyl chloride tend to pick up ink.

Metallic polyethylene, polypropylene and polyvinyl chloride thermoplastic films are found to produce exceptional fine finished articles when used with this process probably due to the heat transfer of the metallic particles in the thermoplastic films. These metallic thermoplastics consist of aluminum powders, giving a special sheen to the folder as for example in silver, gold, red, green, blue, purple, etc. The metallic thermoplastics are available from American Profil of Cedar, Rapids, Iowa.

Where heat sealing is used in the manufacture of stationery articles such as folders and the like, it has been found necessary to use a two-stage system for producing the folders. This two-stage involves sealing the marginal edges followed by a cutting operation to remove the waste of flash materials adjacent the sealed edge. Unfortunately, it has been found that the cutting operation, being subsequent, often leaves marginal strips adjacent to seal which are uneven and unsightly. Further, the subsequent cutting and squaring off of the edges produces sharp corners which often injured or at least cause annoyance to the individual using such articles. In particular, polypropylene is ordinarily difficult to tear.

In most instances where a heat sealed is used, the attempt is to make the seal even in length, height and width. Depending on material, it has been found that if the seal is made having serrations, there is less likelihood of leakage or opening up of the seal. To some extent this is dependent upon the type of thermoplastic material used.

OBJECT AND SUMMARY OF THE INVENTION

It is an object of this invention to provide a method and the article produced thereby which results from the simultaneous sealing and tear/cutting of the marginal edge of the article.

Another object of this invention is to provide a method and article produced thereby which uses ultrasound to vibrate the die having both the cutting and sealing edges to simultaneously seal and tear/cut the margin of the article produced.

A further object of this invention is to provide a method and the article produced thereby which utilizes polypropylene film such as sheet or role material.

Still further object of this invention is to provide a method and the article produced thereby which provides an even bead along the marginal edge of the article produced.

And a further object of this invention is to provide a method and the article produced thereby which has a uniform serrated seal and a marginal edge parallel to the serrated seal.

A still further object of this invention is to provide a method and the article produced thereby in which the corners of the article are rounded rather than pointed.

A further object of this invention is to provide a method and the article produced thereby which eliminates prior two step operation of sealing and subsequent cutting thereby reducing cost of operation.

Another object of this invention is to provide a method and the article produced thereby which gives the article a finished look by producing a uniform bead along the marginal edge.

Yet object of this invention is to provide a method and the article produced thereby which provides a die bar which by special machining eliminates distortion of the die bar providing a distortion factor of not over 0.001".

A still further object of this invention is to provide a method and the article produced thereby which utilizes a step arrangement in the seal edge of the die to allow for even flow of the plastic material depending upon of the number of laminating sheets to be sealed by the seal operation.

A further object of this invention is to provide a method and the article produced thereby which relieves the stresses produced during the seal and tear/cut operation by relieving overflow material produced thereby producing a finer finished article.

Another object of this invention is to provide a method and the article produced thereby which enables the manufacture to tear or strip the article from the excess waste material around the margin which was earlier not possible due to the difficulty to tear polypropylene material.

Yet another object of this invention is to provide a method and the article produced thereby which utilizes ultrasound in order to seal and tear/cut the material in a manner to provide uniform edges to the article.

In summary, this invention relates to the method and article produced thereby which provides an attractive uniform marginal edge with a strong leak proof seal.

These and other objects will be apparent from the following description and the drawings which are described as follows:

BRIEF DESCRIPTIONS OF THE DRAWINGS

FIG. 1 is a side elevational view of the die bar stock prior to machining;

FIG. 2 is cross-sectional view taking along the line of 2—2 of FIG. 1 and viewed in the direction of the arrows.

FIG. 3 is a side elevational view of the die bar stock after rough machining showing distortion upwardly;

FIG. 4 is cross-sectional taken along the line 4—4 of FIG. 3 and viewed in the direction of the arrows.

FIG. 5 is a side elevational view of the rough machine bar stock inverted and showing the bottom machined flat and showing in phantom lines the portion removed by the machining;

FIG. 6 is a cross-sectional view taken along the line 6—6 of FIG. 5;

FIG. 7 is the finished bar stock with the knife edge and serrated seal edges shown inside elevation with the machined portion shown in phantom lines;

FIG. 8 is a cross-sectional view along the line 8—8 of FIG. 7 and viewed in the direction of the arrows;

DETAILED DESCRIPTION OF THE INVENTION

FIGS. 1–12

Figure 9:
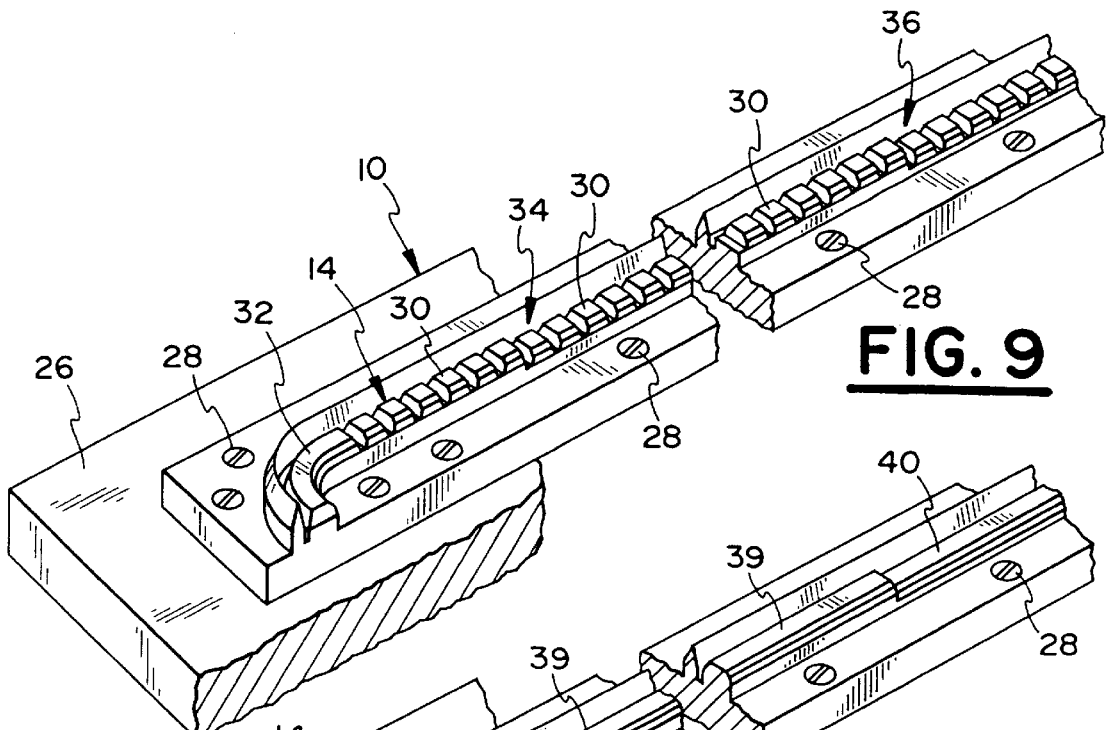
FIG. 9 is a fragmentary perspective view of the finished die mounted on the base support.

In the drawings of FIGS. 1–12 the bar stock B can be of metal such as brass or steel. This is first rough machined to produce side cuts 2 and 4, leaving a die kerf 6, as best shown in FIG. 4. As best illustrated in FIG. 3, the rough machining of the bar stock B produces an upward curve to the bar stock. In order to provide a stable die accurate for the subsequent sealing and tear/cutting, the bar stock B is inverted, as shown in FIGS. 5 and 6, and the bottom 8 is now machined flat, as best shown in FIGS. 5 and 6.

The rough machined bar stock B is now inverted again so that the rough machined bar stock B can be precisioned machined producing the finished die having the cutting edge 12 and the sealing edge 14. The cutting edge 12 is provided with a champfer 16. The sealing edge 14 is provided with inner champfers 18, outer champfers 20, and where shown, side champfers 22. Between the cutting or knife edge 12 and the sealing edge 14 is a flow relief pocket or groove 24, as best shown in FIGS. 7 and 8 which forms a uniform bead 25.

FIG. 9 shows one version of the die 10 mounted to a support plate 26 by screws 28. The die 10 has the sealing edge comprised of serrations 30. It is to be noted that the corner seal edge 32 is not serrated. To provide for different thicknesses of material or forming pockets or the like, the serrated edge 14 is step downwardly as at 34 and 36. It should be noted that the actual die size is enlarge substantially in the drawings and that the height of the sealing edge 14 is only 0.03 inches. The distance between the serrations is about 0.009 inches with the width of the serration being about 0.05 inches. Dimensions may vary depending upon the number of materials layers and material thicknesses but still the dimensional size of the die bar 10 is going to be very small and require extremely accurate machining to eliminate distortion.

Figure 10:
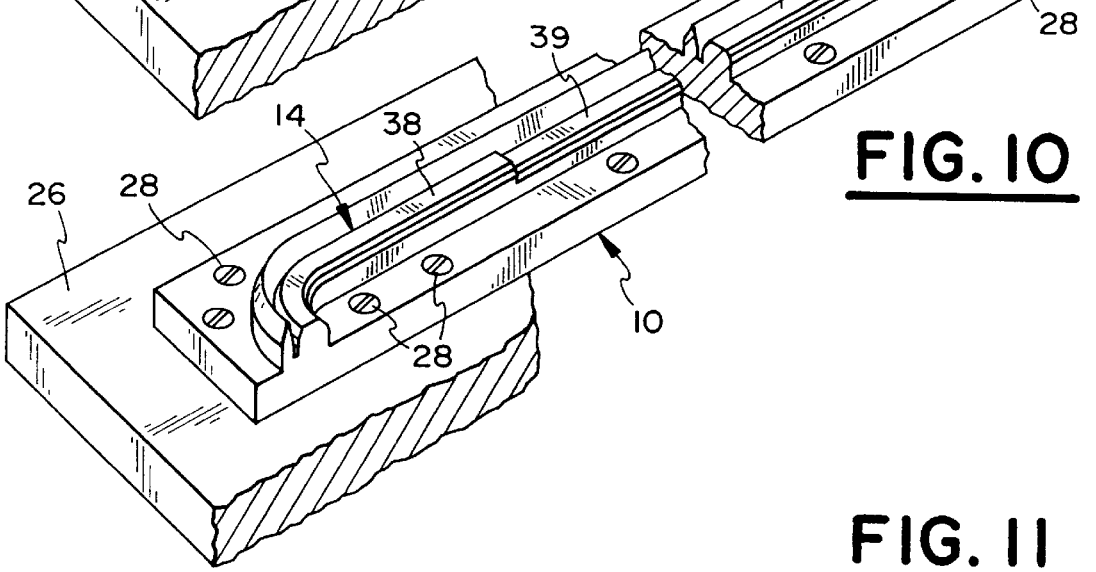
FIG. 10 is a fragmentary perspective view of a modification of the die bar stock.

FIG. 10 shows a slight modification in which the seal edge 14 is non-serrated providing a uniform edge 38 having lower step edges 39 and 40.

Figure 11:
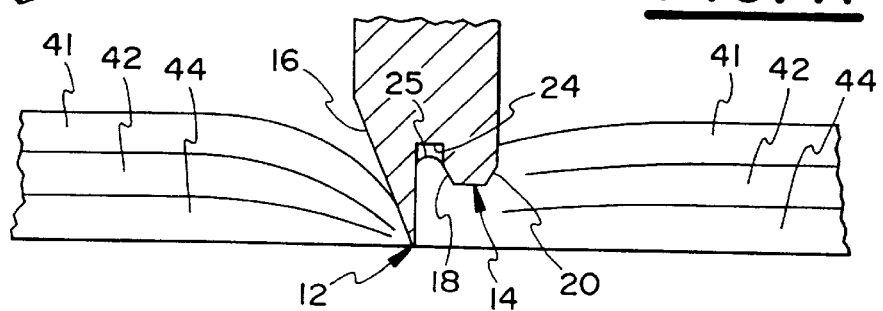
FIG. 11 is a cross-sectional view showing in schematic the manner in which the die comes down on the laminations which are shown broken away.

FIG. 11 shows the knife edge 12 and the sealing edge 14 with the flow relief pocket or groove engaging the materials layers 41, 42 and 44.

Figure 12:
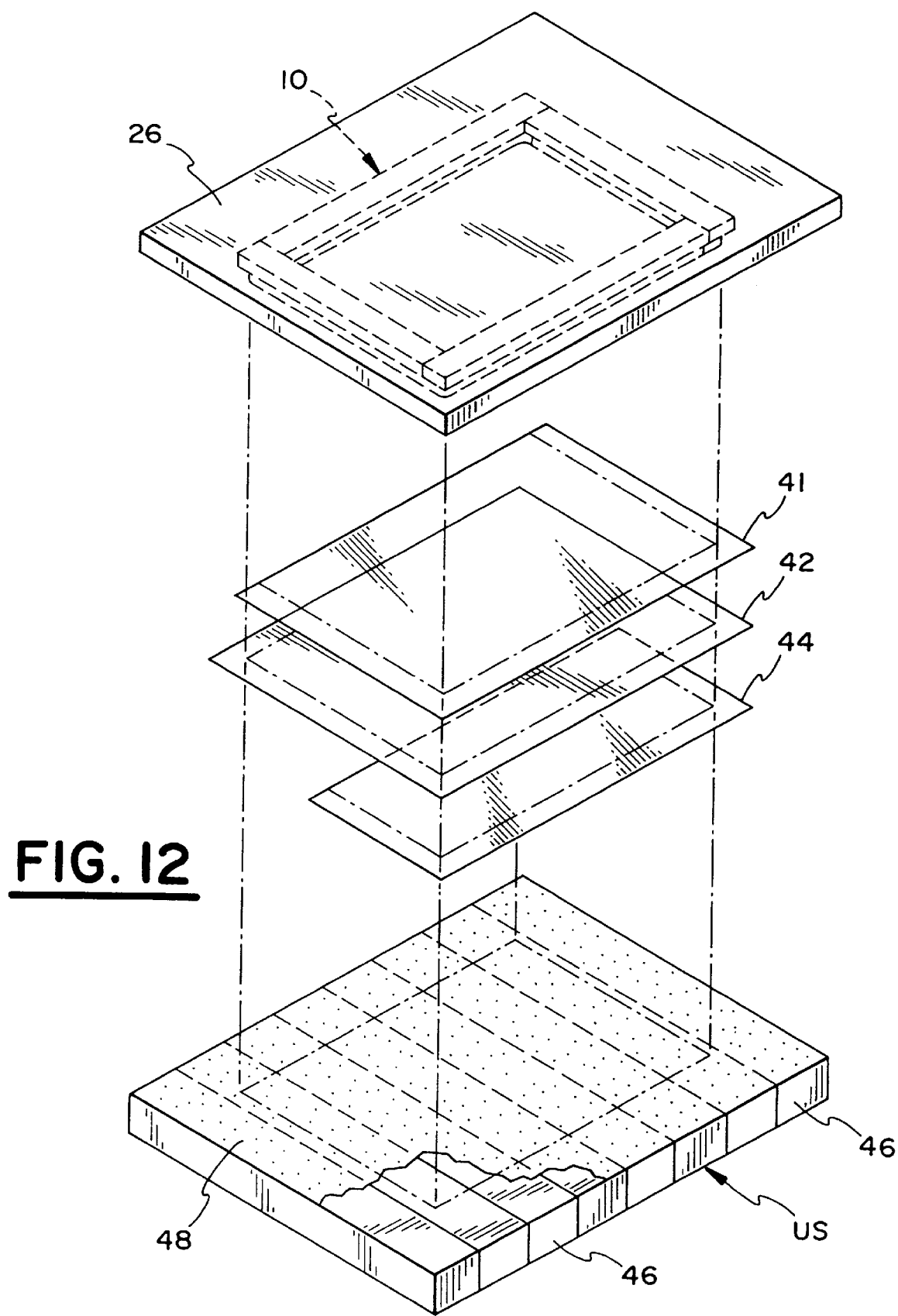
FIG. 12 is an exploded perspective view outlined generally by phantom lines to show in somewhat schematic arrangement the positioning of the sheets of material relative to the ultrasound platen and the die.

FIG. 12 shows an exploded view with the each of the films 41, 42, and 44 as they would be positioned prior to cut on the ultrasonic platen US. The ultrasound platen US consist of a series of a titanium bars 46. The platen US is covered by MYLAR® 48.

It should be noted that the vibrating ultrasound platen US generates friction and heat to the die 10 enabling the die to seal and tear/cut in one step which were before was not possible.

Figure 13:
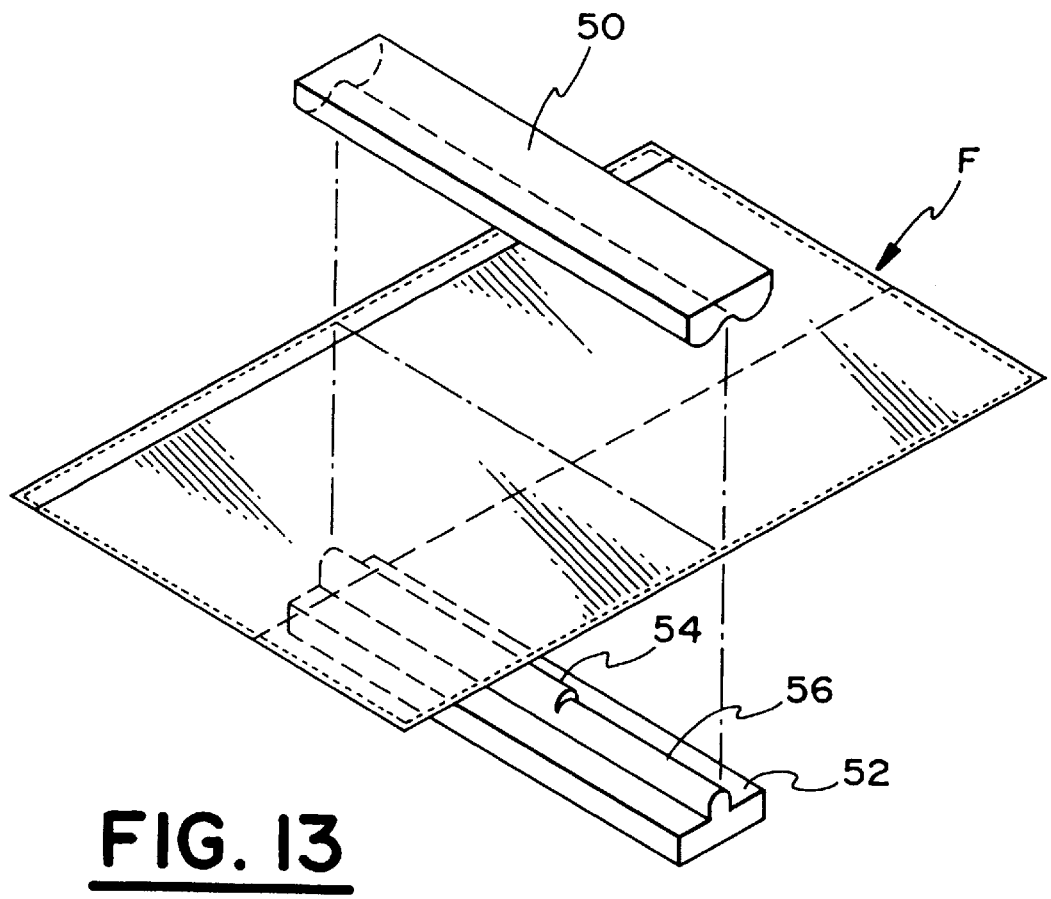
FIG. 13 is a schematic showing in general the operation of the creasing dies.
Figure 14:
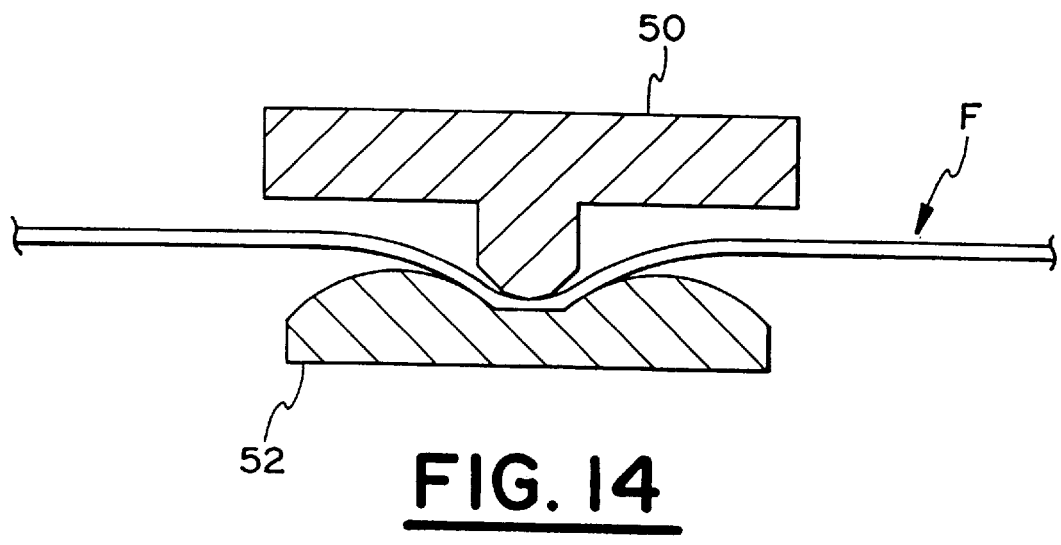
FIG. 14 is a cross-sectional fragmentary view of the material positioned for creasing.
Figure 15:
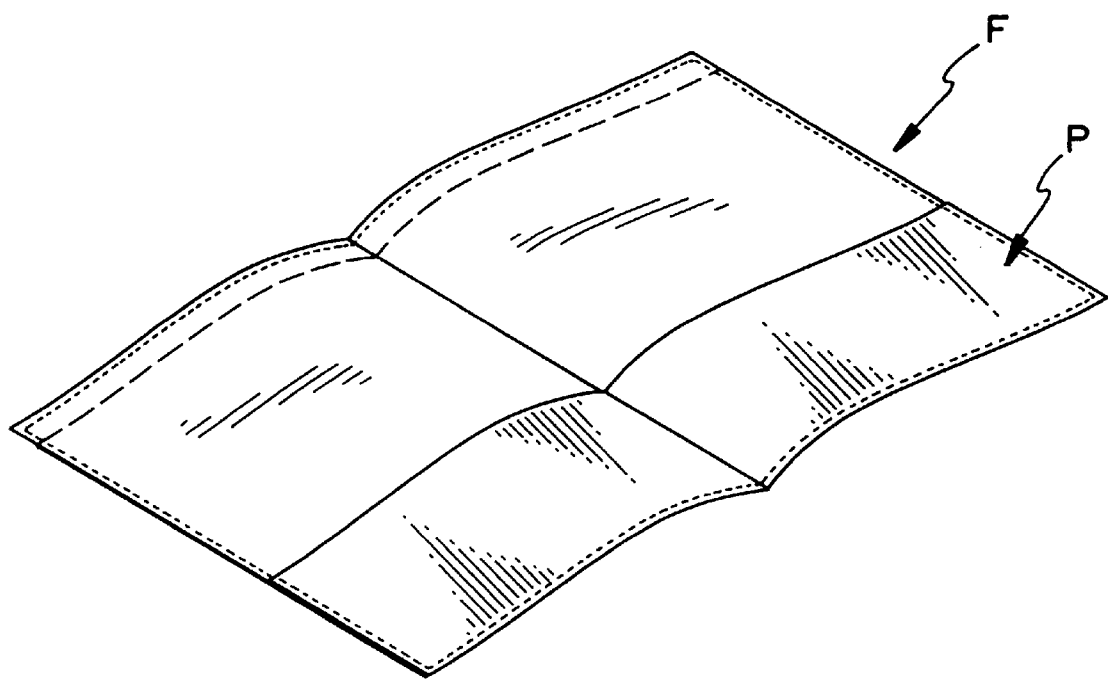
FIG. 15 is a schematic showing in general a typical folder showing a pocket across the folder on the inside of the folder and a pocket on the outside shown in phantom lines.

FIGS. 13, 14 and 15

In FIG. 13, the folder F is shown positioned between the top and bottom dies 50 and 52, as best shown in FIG. 14 which forms a crease for the folder F. Steps 54 and 56 are provided to take care of the additional thickness of material forming the pocket P of the folder F, shown in FIG. 15.

FIG. 16

Figure 16:
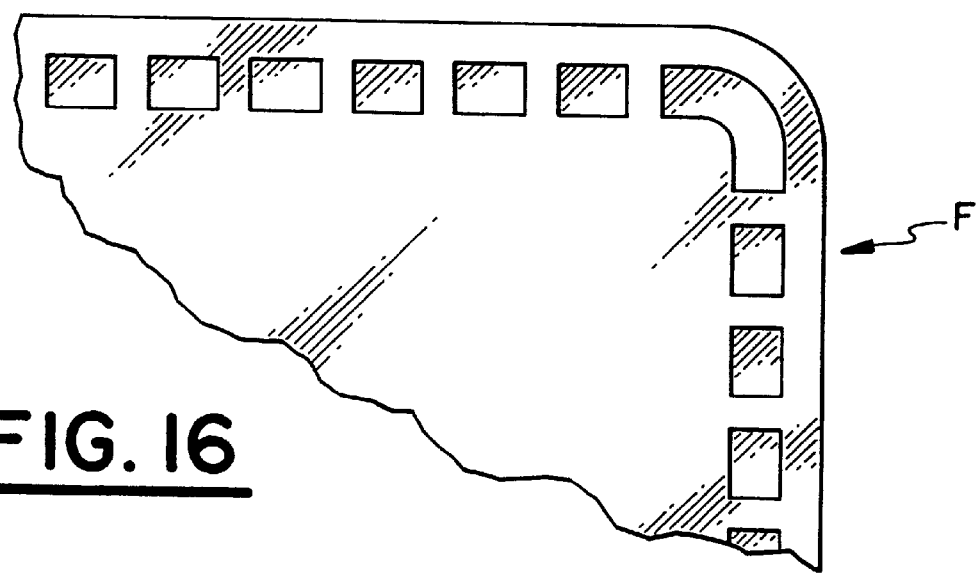
FIG. 16 is a fragmentary top plan view illustrating a corner of the folder produced.

FIG. 16 shows enclosed how a corner of the folder F appears with a serrated and evenly cut edge.

Operation

In the operation of the method, a first film of thermoplastic material is positioned on an ultrasonic platen US with the film having a length and breath sufficient to encompass the entire length and breadth of the article to be produced while providing excess material outside of the margin of the stationery article to be produced. At least a second film of thermoplastic material bondable to the first film is positioned overlying the first film encompassing only a portion of the length and breadth of the first film and a portion of the length and breadth of the article to be produced and providing excess material outside of that portion of the length and breadth of the stationery article to be produced. After the two films have been positioned, the die 10 having the knife and seal edges 12 and 14 is applied to the first and second thermoplastic films while activating the ultrasonic platen US causing the platen US and the die 10 to vibrate generating frictional heat and simultaneously sealing and tear/cutting the margin of the article to be produced with the seal just inside the margin of the article to be produced and the tear/cut on the margin of the article to be produced laminate the first and the second thermoplastic films together producing an airtight leak-proof seal. If third or fourth films are used, step dies are required. The thermoplastic materials, polyethylene, polypropylene, polyvinyl chloride and metallic polyethylene, polypropylene, polyvinyl chloride may be used in the process with polypropylene and metallic polypropylene being preferred.

Subsequent to the sealing and tear/cutting, the excess material is removed from the margin of the article produced leaving the article with a uniform margin bead 25 adjacent and parallel to the seal. It is to be noted that the volume of the relief area is based upon the thickness of thermoplastic material positioned at the time of sealing and tear/cutting and that this volume is based on 40–60% of the thickness of the thermoplastic material. Although 50% of the thickness is preferred.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

Having thus described our invention what we claim is:

1. The method of producing a laminated vinyl thermoplastic stationery article from thermoplastic film material including the steps of:
   a) providing a first film of thermoplastic material taken form the group consisting of polyethylene, polypropylene, polyvinyl chloride, metallic polyethylene, metallic polypropylene and metallic polyvinyl chloride upon an ultrasonic platen having a length and breadth sufficient to encompass the entire length and breadth of said article to be produced while providing excess material outside of the margin of the stationery article to be produced;
   b) providing at least a second film of thermoplastic material taken form the group consisting of polyethylene, polypropylene, polyvinyl chloride, metallic polyethylene, metallic polypropylene and metallic polyvinyl chloride bondable to said first film and overlying said first film and encompassing only a portion of said length and breadth of said first film and a portion of the length and breadth of said article to be produced and providing excess material outside of that portion of the length and breadth of the stationery article to be produced;
   c) applying a compound die having knife and seal edges to said first and at least said second thermoplastic films while activating said ultrasonic platen causing said platen and said die to vibrate generating frictional heat and simultaneously sealing and tear/cutting the margin of the article to be produced with the seal just inside the margin of the article to be produced and the tear/cut on the margin of the article to be produced thereby laminating the first and at least second thermoplastic films together producing an airtight leakproof seal; and
   d) removing the excess material from the margin of the article produced leaving the article with a uniform margin adjacent and parallel the seal.

2. A laminated thermoplastic stationery article produced by the method of claim 1.

3. The method of claim 1 and including the step of:
   a) providing a lower step in said seal edge in the zone of seal produced where the first and at least second thermoplastic films are sealed.

4. A laminated thermoplastic stationery article produced by the method of claim 3.

5. The method of claim 1 and including the step of:
   a) providing a relief area in said die between said seal and said knife edges to receive overflow material produced during the sealing and tear/cutting.

6. A laminated thermoplastic stationery article produced by the method of claim 5.

7. The method of claim 5 and including the step of:
   a) providing said relief area with a thickness based on about 40% to about 60% of the volume of the thermoplastic material positioned at the time of sealing and tear/cutting between the knife edge and the seal edge.

8. A laminated thermoplastic stationery article produced by the method of claim 7.

9. The method of claim 7 and including the step of:
   a) providing said relief area with a volume based on about 50% of the thickness of the thermoplastic films positioned at the time of sealing and tear/cutting between the knife edge and the seal edge.

10. A laminated thermoplastic stationery article produced by the method of claim 9.

11. The method of claim 1 and including the step of:
    a) providing a serrated edge to said seal edge.

12. A laminated thermoplastic stationery article produced by the method of claim 11.

13. The method of claim 11 and including the step of:
    a) providing a non-serrated edge portion to said seal edge.

14. A laminated thermoplastic stationery article produced by the method of claim 13.

15. The method of claim 13 and including the step of:
    a) providing a curved non-serrated edge portion to said seal edge.

16. A laminated thermoplastic stationery article produced by the method of claim 15.

17. The method of claim 1 and including the step of:
    a) providing polypropylene as a thermoplastic material of said first and at least second films.

18. A laminated thermoplastic stationery article produced by the method of claim 17.

19. The method of claim 1 and including the steps of:
    a) providing flat die bar stock having top and bottom surfaces;
    b) rough machining said die bar stock top surface to produce a pre-knife and seal edge portion causing said bottom of said flat bar stock to have an upwardly curve distortion;
    c) machining flat said bottom of said die bar stock and removing said distortion; and
    d) machining said knife and seal edges in said die bar stock knife and seal portion providing a distortion factor of not over 0.001".

20. A laminated thermoplastic stationery article produced by the method of claim 19.

21. The method of claim 11 and including the step of:
    a) providing champfers to said serrations of said serrated edge.

22. A laminated thermoplastic stationery article produced by the method of claim 21.

23. The method of producing a laminated thermoplastic stationery article as in claim 1 and including the steps of:
    a) providing said knife edge extending beyond said seal edge.

24. A laminated thermoplastic stationery article produced by the method of claim 23.

25. The method of claim 1, and including:
   a) producing simultaneously with said sealing and tear/cutting a bead on the margin of the article.

26. A laminated thermoplastic stationery article produced by the method of claim 25.

27. The method of claim 1 and including the steps of:
   a) providing metallic polypropylene as the thermoplastic film of said first and at least second films.

28. A laminated thermoplastic stationery article produced by the method of claim 27.

* * * * *